March 1, 1966  M. HOFFMAN  3,237,543
PORTABLE DUPLEX VACUUM TYPE FILM HOLDER
Filed April 24, 1963

INVENTOR.
MORRIS HOFFMAN
BY Leonard H. King
ATTORNEY

United States Patent Office 3,237,543
Patented Mar. 1, 1966

3,237,543
PORTABLE DUPLEX VACUUM TYPE FILM HOLDER
Morris Hoffman, 240 Jerusalem Ave., Hicksville, N.Y.
Filed Apr. 24, 1963, Ser. No. 275,387
15 Claims. (Cl. 95—66)

This invention relates generally to vacuum holders for cameras using thin sheet films of flexible photosensitive material and more particularly to a portable film holder adapted to accommodate a pair of photosensitive sheets in a single, removable frame under a condition of vacuum.

In certain photographic work, such as with cameras using a ground glass for focusing and with color film in particular, the stringent requirements of precision necessitate that the photosensitive material is supported and firmly held, as by suction, against a flat plane. It is conventional practice in the art to employ such a vacuum back as an integral part of a camera and most commonly, it is in the form of a hinged back. The drawbacks to this arrangement are that the holder must be reloaded after each exposure and the usual camera back must be located in a darkroom. In my copending application, Serial No. 64,079, now U.S. Patent No. 3,146,690, issued September 1, 1964, a portable film holder for single sheets of thin, photosensitive material is described which permits placing the camera remote from the darkroom, the sheet being held by clamps prior to the application of a vacuum.

The present invention provides twice the film capacity of my prior type holder in apparatus the same size as heretofore. Consequently, it may be used in existing cameras without structural alteration thereto. Additionally, by being able to load two sheets into a single holder instead of one sheet, the operator will be able to spend substantially less time in the darkroom and consequently more time productively at the camera.

The holder of the present invention is substantially the same sixe as conventional nonvacuum film holders. However, the vacuum chamber is provided with a plurality of apertures on both the front face and the rear face. In this manner, vacuum applied to a common chamber will simultaneously hold the film on either side since both sets of apertures are in communication with the evacuated chamber. Film hold-down bars are provided in spaced relationship to each film mounting surface so that the thin, flexible photosensitive medium will be firmly held flat even without the application of a vacuum at the camera site. In addition, a pair of light shields, slidably removable from the holder are provided so that the holder may be loaded in a darkroom and then taken to the camera for exposure.

It is therefore an object to provide a duplex vacuum holder for thin, flexible photosensitive mediums.

It is another object to provide a film holder having a vacuum chamber common to two spacedly opposed sheets of photosensitive material.

An additional object is to provide a dual holder for thin, flexible photosensitive material that has substantially the same dimensions as the prior art single sheet holders so that it may be utilized with existing cameras.

A further object is to provide a duplex, portable vacuum type film holder for thin, flexible photosensitive material.

Still another object is to provide a duplex, portable vacuum type film holder having integral means to retain thin, flexible photosensitive material prior to the application of vacuum.

A further object is to provide a duplex, portable vacuum type film holder having removable light shields that permit loading of thin, flexible photosensitive material at a location remote from the camera.

These and other objects of the present invention will, in part, be pointed out with particularity and will, in part, be apparent from the following description taken in conjunction with the appended drawing.

In the various figures of the drawing, like reference characters designate like parts.

Figure 1:
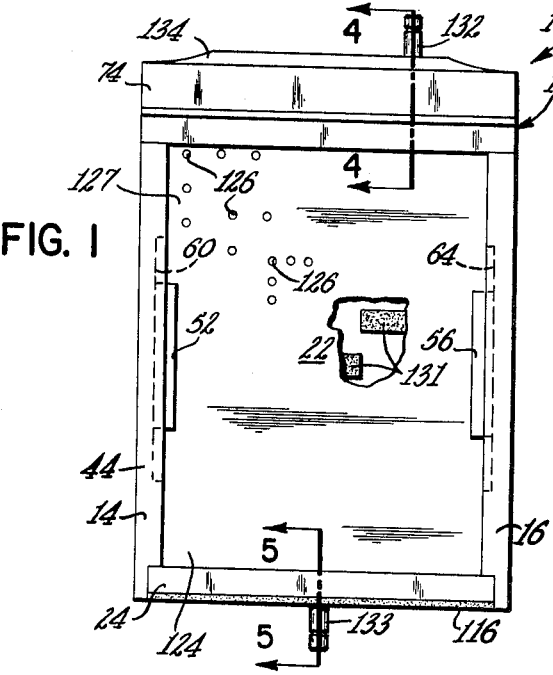
FIG. 1 is a plan view of the front face of the present invention.
Figure 2:
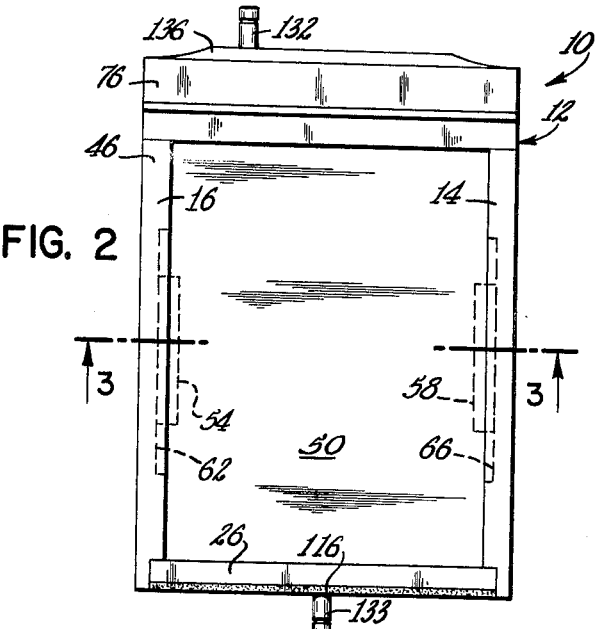
FIG. 2 is a plan view of the rear face of the present invention.
Figure 5:
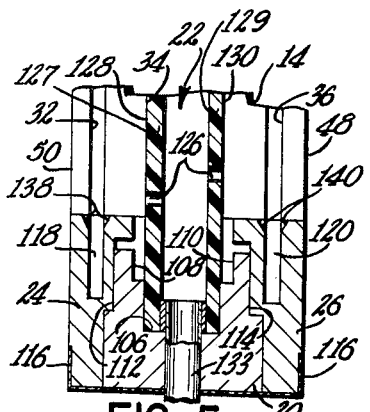
FIG. 5 is a cross sectional view taken along line 5—5 of FIG. 1.
Figure 3:
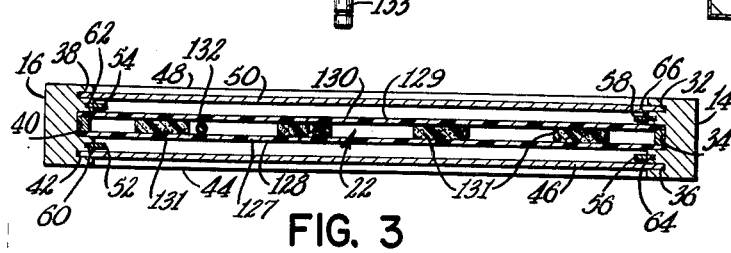
FIG. 3 is a cross sectional view taken along line 3—3 of FIG. 2.

Referring now to the drawing, FIG. 1 and FIG. 2 illustrate front and rear views of the duplex, portable vacuum type film holder of the present invention. In the interest of clarity and simplicity, the slidably removable light shields are shown in FIG. 2 but not in FIG. 1.

Film holder 10 is comprised of a frame 12 having side rails 14 and 16, top and bottom cross pieces 18 and 20, respectively, common vacuum chamber 22, hinge members 24 and 26, as well as resilient light baffles 28 and 30.

Rails 14 and 16 are secured to top and bottom cross pieces 18 and 20 by means of mortise and tenon jointing and are advantageously fabricated from a relatively stable material such as 1″ milled birch. Running the length of rails 14 and 16 are parallel grooves 32, 34, 36 and 38, 40 and 42, respectively. Grooves 32 and 38 are spaced from front face 44 of frame 12 and are dimensioned to receive slidably removable front light shield 46. Grooves 36 and 42 are spaced from the rear face 48 of frame 12 and are dimensioned to receive slidably removable rear light shield 50. Grooves 34 and 40 are located substantially along the centerline of rails 14 and 16 and are adapted to receive common vacuum chamber 22.

Hold-down bars 52, 54, 46 and 58 are thin metallic strips held in slots 60, 62, 64 and 66 in rails 14 and 16, respectively. The bars are positioned such that they are in spaced relation to the opposing faces of common suction chamber 22, the spacing being slightly more than the thickness of a sheet of thin, flexible photosensitive material. In the embodiment illustrated, the bars are shown substantially centered in the holder frame but it should be understood that they may be made longer to extend substantially the length of rails 14 and 16.

Top cross piece 18 is provided with a centralized groove 68 over substantially its entire length and contiguous with grooves 34 and 40 of side rails 14 and 16, respectively. Central groove 68 is adapted to retain one end of common vacuum chamber 22. Spacedly secured to front face 70 and rear face 72 of top cross piece 18 are cover plates 74 and 76, respectively. Front and rear faces 70 and 72 are provided with milled seats 78 and 80 substantially matching in size, shape and location milled seats 82 and 84 formed on the inside surface of cover plates 74 and 76, respectively.

Figure 4:
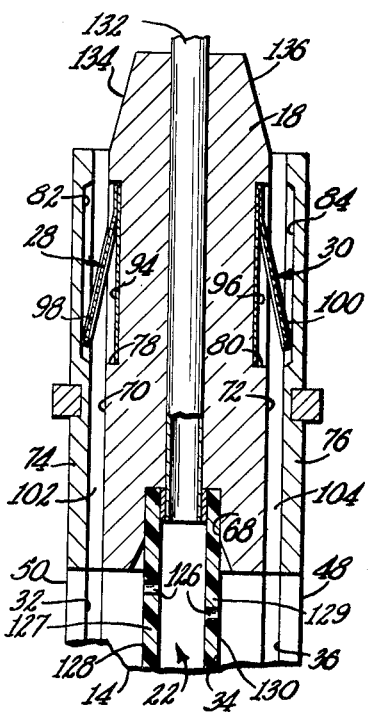
FIG. 4 is a cross sectional view taken along line 4—4 of FIG. 1.

Resilient light baffles 28 and 30 are positioned such that legs 94 and 96 are positioned in seats 78 and 80 and fabric covered resilient legs 98 and 100 are positioned in seats 82 and 84. It will be seen in FIG. 4 that, with no light shield in place, light baffles traverse spaces 102 and 104 defined by the spacing between top cross piece 18 and cover plates 74 and 76, respectively. Spaces 102 and 104 are contiguous with grooves 32, 38 and 36, 42, formed in side rails 14 and 16.

Bottom cross piece 20 is provided with a centralized groove 106 over substantially its entire length and contiguous with grooves 34 and 40 of side rails 14 and 16.

Adjacent groove 106 are stepped down portions 108 and 110 proximate either side of common vacuum chamber 22. Still other stepped portions 112 and 114 are adapted to seat front and rear hinge members 24 and 26 which are secured to bottom cross piece 20 by means of fabric 116 affixed thereto by means of cement. Hinges 24 and 26 are further provided with grooves 118 and 120 along substantially their entire lengths contiguous with grooves 32, 38 and 36, 42 of rails 14 and 16. Stepped portions 122 and 124 are provided on the inner faces of hinges 24 and 26 in spaced relation to common vacuum chamber 22.

Frame 12 maintains chamber 22 substantially equidistant from both pairs of hold-down bars and light shields. Chamber 22 is preferably made from 0.01"–0.05" thick phenolic plastic plates 127, 129, spaced approximately ¼" apart by foamed polystyrene blocks 131 bonded thereto by epoxy cement, and is provided with a plurality of apertures 126 on front and rear surfaces 128 and 130, respectively.

The all plastic chamber construction has many advantages. It is light in weight, and is not subject to warping resulting from environmental changes. It is to be understood that other suitable and mechanically equivalent plastics, such as polyesters and polyurothenes, may be substituted for the phenolic and foamed polystyrene plastics, respectively.

A further advantage of the plastic plate is that it may be more easily punched than a metal sheet.

It should be noted that the perforations in one plate are not aligned with the perforations in the other plate. If the perforations were aligned, there is a likelihood that light may pass through the exposed film, the perforations in one plate, and enter the perforations in the other plate exposing the portions of the other film adjacent thereto.

First coupling means 132 in communication with vacuum chamber 22 provides means for insertion of a vacuum hose leading from an exhaust pump (not shown). Second coupling means 133, located in the bottom portion of the frame and similarly in communication with vacuum chamber 22 provides alternate vacuum inducing means to be used when the source of vacuum is integral with the camera. It should be understood that when one coupling means is used, the other one is rendered inoperative by means of a plug inserted in its place. In the absence of both channels for various sizes of film and suitable valving means, the operator may mask off with paper or cardboard the portion of the holder not covered by the film.

To facilitate the insertion of light shields 46 and 50, top cross piece 18 is beveled at 134 and 136 and bottom cross piece grooves 118 and 120 are beveled at 134 and 136.

In order to use the apparatus, the operator, in a darkroom under safe light conditions, pivots the hinge out of position and inserts sheets of paper beneath the hold-down bars on both faces of the vacuum chamber. By opening the hinges, it is a simple matter to slip the paper in whereby it will be held by the hold-down bars until the application of suction. The hinges are then closed and the light shields inserted. It will be seen that the light shields must depress the light baffles in order to traverse the grooves in the top cross piece and in the side rails. The light baffles therefore serve a dual purpose. When a slidable light shield is in place, the resilient leg thereof serves to clamp and retain it so that the shield cannot fall out and inadvertently expose the film. When the light shield is removed just prior to exposure the resilient light baffle returns to the position shown in FIG. 4 to prevent entrance of light that could damage the film. Further, since the light shield grooves are contiguous between the side rails and the hinge members of the bottom cross piece, insertion of the light shields will prevent opening of the hinges.

There has been disclosed heretofore the best embodiment of the invention presently contemplated and it is to be understood that various changes and modifications may be made by those skilled in the art without departing from the spirit of the invention.

What is claimed is:

1. A portable vacuum type holder for a pair of thin sheets of flexible photosensitive film having top, bottom and side edges, said holder being adapted for insertion into a camera and for retention therein means of interfitting parts, said holder comprising:
    (A) a frame member having top and bottom cross pieces and a pair of side rails;
    (B) means to hold the top and bottom edges of said sheets;
    (C) a vacuum chamber disposed within said frame member,
        (a) said chamber comprised of substantially flat, spacedly opposed front and rear surfaces, each of said surfaces having a plurality of apertures therethrough;
    (D) sheet holding means spaced from said front and rear surfaces of said chamber adapted to retain the middle portion of the sheet side edges proximate to said surfaces in the absence of vacuum; and
    (E) coupling means in communication with said chamber, said coupling means adapted for the application of a vacuum whereby a pair of thin, flexible sheets of photosensitive film are firmly held substantially flat against said front and rear surfaces of said chamber.

2. The apparatus of claim 1 including a pair of slidably removable light shields adapted for insertion into said frame member, each of said light shields arranged to overlay a single sheet of film inserted in said holder on opposite sides of said chamber to prevent exposure thereof.

3. The apparatus of claim 1 including resilient light baffles contained within said top cross piece frame of said frame member in engagement with said slidable light shields.

4. The apparatus of claim 1 wherein the sheet holding means is comprised of two pairs of bars carried by said side rails and disposed within said frame member, each of said pairs of bars being spaced from the apertured surfaces of said chamber by a dimension slightly greater than the thickness of the thin sheet of flexible photosensitive material.

5. The apparatus of claim 4 wherein said holding means is positioned at substantially the midpoint of said frame member.

6. The apparatus of claim 4 wherein said holding means extends at least partially the length of said frame member.

7. In combination with a camera utilizing a ground glass for focusing, a portable vacuum type film holder adapted for insertion into the camera and for retention therein by means of interfitting parts, said holder comprising:
    (A) a frame member having top and bottom cross pieces and a pair of side rails;
    (B) means to hold the top and bottom edges of the sheets;
    (C) a vacuum chamber disposed within said frame member,
        (a) said chamber being comprised of substantially flat, spacedly opposed front and rear surfaces, each of said surfaces having a plurality of apertures therethrough;
    (D) sheet holding means spaced from said front and rear surfaces of said chamber adapted to retain the middle portion of the sheet side edges proximate to said surfaces in the absense of vacuum; and
    (E) coupling means in communication with said chamber, said coupling means adapted for the application of a vacuum whereby a pair of thin, flexible sheets of photosensitive film are firmly held substantially flat against said front and rear surfaces of said chamber.

8. The apparatus of claim 7 including a pair of slidably removable light shields adapted for insertion into said frame member, each of said light shields arranged to overlay a single sheet of film inserted in said holder on opposite sides of said chamber to prevent exposure thereof.

9. The apparatus of claim 7 including resilient light baffles contained within said top cross piece of said frame member in engagement with said slidable light shields.

10. The apparatus of claim 7 wherein the sheet holding means is comprised of two pairs of bars carried by said side rails and disposed within said frame member, each of said pairs of bars being spaced from the apertured surfaces of said chamber by a dimension slightly greater than the thickness of the thin sheet of flexible photosensitive material.

11. The apparatus of claim 10 wherein said holding means is positioned at substantially the midpoint of said frame member.

12. The apparatus of claim 10 wherein said holding means extends at least partially the length of said frame member.

13. A portable vacuum type holder for a pair of thin sheets of flexible photosensitive film having top, bottom and side edges, said holder being adapted for insertion into a camera and for retention therein by means of interfitting parts, said holder comprising:
 (A) a frame member having top and bottom cross pieces and a pair of side rails;
 (B) means to hold the top and bottom edges of said sheets;
 (C) a vacuum chamber disposed within said frame member,
  (a) said chamber being comprised of substantially flat, spacedly opposed plastic front and rear plates, each of said plates having a plurality of apertures therethrough;
 (D) spacers of foam plastic interposed between said front and rear plates;
 (E) sheet holding means spaced from said front and rear surfaces of said chamber adapted to retain the middle portion of the sheet side edges proximate to said surfaces in the absence of vacuum; and
 (F) coupling means in communication with said chamber, said coupling means adapted for the application of a vacuum whereby a pair of thin, flexible sheets of photosensitive film are firmly held substantially flat against said front and rear surfaces of said chamber.

14. The vacuum type holder of claim 13 wherein said apertures in said front plate are not in coaxial alignment with said apertures in said rear plate.

15. The vacuum type holder of claim 1 wherein said apertures in said front plate are not in coaxial alignment with said apertures in said rear plate.

References Cited by the Examiner
UNITED STATES PATENTS

| | | | |
|---|---|---|---|
| 1,631,479 | 6/1927 | Folmer | 95—66 X |
| 2,078,741 | 4/1937 | Stenmark | 95—66 |

JOHN M. HORAN, *Primary Examiner.*

NORTON ANSHER, *Examiner.*